Oct. 5, 1971  B. GOLDEN  3,609,865
FORK-LIKE FOOD UTENSIL
Filed Aug. 27, 1969
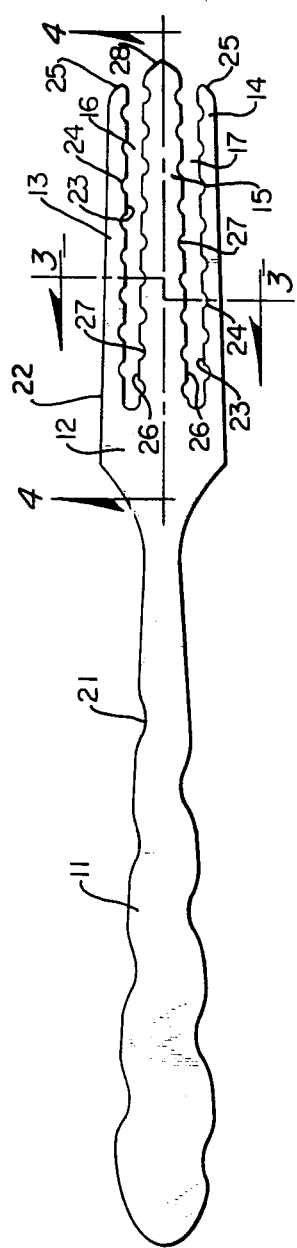
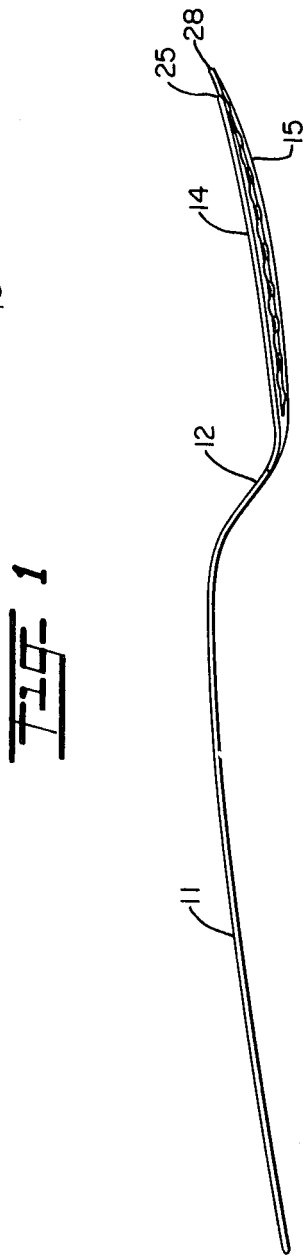
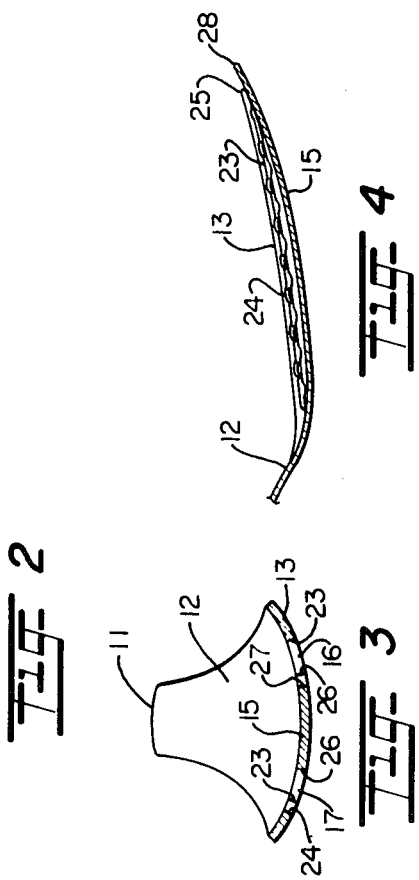
INVENTOR
BOYD GOLDEN
BY
ATTORNEY

United States Patent Office 3,609,865
Patented Oct. 5, 1971

3,609,865
FORK-LIKE FOOD UTENSIL
Boyd Golden, 7405 E. 22nd Ave.,
Denver, Colo. 80207
Filed Aug. 27, 1969, Ser. No. 853,313
Int. Cl. A47j 43/28
U.S. Cl. 30—322     8 Claims

ABSTRACT OF THE DISCLOSURE

A novel food utensil has prongs with offset curved recessed sections along inner facing sides thereof to define food-receiving slots between the prongs whereby the prongs cooperate to prevent food such as spaghetti from slipping therebetween. The prongs are essentially flat and have a slight double curvature laterally and longitudinally thereof and terminate in blunt, V-shaped forward end portions.

---

My invention relates to improvements in food flatware of the fork type intended for household purposes and more particularly to a novel and improved fork-like utensil which is particularly suitable for use in handling spaghetti.

Difficulty is frequently encountered in picking up certain food items such as spaghetti with the conventional silverware. To overcome this problem some attempts have been made to provide irregular surfaces along the sides of forks such as described in the U.S. patent to Sampson No. 2,637,104. In general the device described therein employs laterally straight prongs with irregular, sharp, saw-tooth and knife-like edges. Certain difficulties are encountered in making a utensil with the teeth of the nature described therein due to the irregular teeth shapes involved so that it is more difficult to employ the less expensive stamping procedures in the making thereof.

Accordingly, it is an object of this invention to provide a novel and improved fork-like utensil which is particularly suitable for handling certain foods such as spaghetti and the like.

Another object of this invention is to provide a fork-like food utensil characterized by smooth rounded edges and no sharp points which provides an effective food-gripping action for handling spaghetti and like foods.

Yet a further object of this invention is to provide a novel and improved food utensil characterized by a double or concavo-convex curvature having essentially elongated sinusoidal-shaped slots provided between the relatively flat but slightly curved prongs thereof which may be readily made of stainless steel and formed by stamping.

In accordance with the present invention there is provided a novel and improved food utensil characterized by essentially flat, double-curved prongs having offset curved recessed sections in the facing sides thereof which are readily made by less expensive stamping procedures and serve to grip food such as spaghetti to facilitate the handling thereof. The curved prongs form a shallow upper cavity and have relatively blunt front end portions so there are no sharp points on the utensil.

The above and other objects of the present invention will become more readily appreciated and understood from the following detailed description of a preferred form of the present invention when taken together with the accompanying drawings, in which:

FIG. 1 is a top plan view of a fork-like utensil embodying features of my invention.

FIG. 2 is a side elevational view thereof.

FIG. 3 is a sectional view taken along lines 3—3 of FIG. 1.

FIG. 4 is a sectional view taken along lines 4—4 of FIG. 1.

Referring now to the drawing the novel fork-like utensil shown comprises an elongated handle 11 terminating at its forward end in an enlarged base portion 12 from which there extends outer side prongs 13 and 14 and a central or intermediate prong 15; the prongs being separated by elongated slots 16 and 17.

The handle 11 may be of a desired size and shape and is arched along its length as are conventional forks and may be decorated as desired. As shown the handle includes recesses 21 formed along the outer side edges to illustrate one form of decoration. The outer side prongs 13 and 14 are essentially the same size and shape with a left and right side orientation and have smooth straight outer side edges 22, together with alternating flat sections 23 and curved recessed sections 24 of essentially semi-circular contour along its inner sides. The forward end portion 25 of the side prongs 13 and 14 is essentially V-shaped but is relatively blunt at the apex to eliminate any sharp points.

The central prong 15 is substantially wider than the side prongs and has alternating flat sections 26 and curved recessed sections 27 in both side edges of an essentially semi-circular contour of a similar size and shape to those of the outer prongs. Sections 26 and 27 are arranged in line with one another on each side of the central prong and are offset or longitudinally shifted from corresponding facing sections 23 and 24 so that the curved recessed sections on one side of the slot face flat sections on the other side of the slot and vice versa and in this way the general shape of the slots 16 and 17 formed between the prongs are substantially sinusoidal. An intermediate slot section of an essentially uniform width is formed by the opposed flat sections 23 and 26 and the curved recessed sections 24 and 27 alternate from side to side in the formation of the outer boundary of the slots. The forward end portion 28 of the central prong 15 is also essentially V-shaped and relatively blunt at the apex and also extends beyond end portions 25.

As best seen in FIGS. 2, 3 and 4 the base 12 and prongs 13, 14 and 15 have a double curvature or concavo-convex curvature extending laterally and longitudinally thereof to provide a shallow food-holding cavity along its upper surface. In its use the utensil may be forced into a quantity of food such as spaghetti which will slide through the slots and be held between the facing curved recessed sections and the flat sections whereby to prevent the food from sliding from between the prongs and at the same time readily release it for eating purposes as required.

From the foregoing it is readily apparent that the utensil described can be made from a metal such as stainless steel using metal stamping procedures which will greatly reduce the total cost thereof over molding procedures or stamping plus machining as no extra machining is required in forming the inner food engaging surfaces on the prongs. The particular construction described has been found to be very effective in gripping food such as spaghetti but it is understood that its use is not limited to this food as it is also suitable for handling spinach, beans and rice to name but a few other examples.

It is therefore to be understood that various modifications and changes may be resorted to in the preferred form described and illustrated herein without departing from the spirit and scope of the present invention as defined by the appended claims.

What is claimed is:

1. A fork-like utensil comprising an elongated handle and outer prongs and an inner prong extending from one end of the handle and spaced to define elongated slots open at the front end between the prongs, the inner side edges of the outer prongs being provided with a series of alternating flat and generally concave recessed portions arranged longitudinally thereof, said flat and recessed portions having a uniform length dimension and said recessed portions having a uniform shape, said inner prong having outer side edges provided with a series of alternating flat and generally concave recessed portions arranged longitudinally thereof, the flat and recessed portions on said inner prong having a uniform length dimension and said recessed portions having a uniform shape which length and shape are the same as that of the flat and recessed portions on said outer prongs, each of said recessed portions being opposite from a flat portion on the facing prong whereby the prongs cooperate to prevent the food from slipping from the prongs.

2. A fork-like food utensil as set forth in claim 1 wherein each of said recessed portions are essentially semi-circular in shape.

3. A fork-like utensil as set forth in claim 1 wherein each of said prongs has an essentially blunt, V-shaped outer end portion.

4. A fork-like utensil as set forth in claim 1 wherein said prongs are of a flat-sided uniform thickness and have double-curved upper and lower surfaces extending laterally and longitudinally thereof to form a shallow cavity along the upper surfaces thereof.

5. A fork-like utensil as set forth in claim 1 wherein the slots between said prongs are essentially sinusoidal in shape with a flat portion opposite from each half of the sinusoidal shape.

6. A fork-like utensil as set forth in claim 1 wherein said central prong is wider and longer than said outer prongs.

7. A fork-like food utensil comprising a handle and essentially flat, double-curved, inner and outer prongs extending from one end of the handle and spaced to define elongated slots between the prongs, the inner side edges of the outer prongs and the outer side edges of the inner prongs being shaped with a series of alternating concave and flat sections to define an essentially sinusoidal-shaped slot of uniform size and shape with a flat section directly opposite each concave section whereby the prongs cooperate to prevent food from slipping between the prongs.

8. A fork-like utensil for handling spaghetti and the like comprising an elongated handle, inner and outer prongs having a uniform thickness and a flat-sided cross-section extending from a common enlarged base section at one end of the handle and spaced apart to define elongated slots therebetween, said outer prongs having smooth outer side edges and inner side edges provided with a series of alternating semi-circular shaped recessed sections separated by flat side edge sections, said sections having a uniform length dimension and said recessed sections having a uniform shape, said inner prong having outer side edges provided with a series of essentially semi-circular shaped recessed sections separated by flat side edge sections, the recessed and flat section of said inner prong having a uniform length dimension and shape which are the same as that of the outer prongs, the recessed sections of the inner prong being offset from the opposite recessed sections of the outer prongs and facing a flat section on the opposite prong to form essentially sinusoidal-shaped slots with a flat section directly opposite of each half of the sinusoidal shape whereby the prongs cooperate to prevent spaghetti therebetween from slipping from the prongs.

References Cited
UNITED STATES PATENTS

| | | | |
|---|---|---|---|
| 54,514 | 5/1866 | Dungin | 30—322 |
| 1,751,853 | 3/1930 | Buck | 30—322 X |
| 1,818,296 | 8/1931 | Bothe | 30—322 |

FOREIGN PATENTS

| | | |
|---|---|---|
| 1,142,636 | 4/1957 | France. |

ROBERT C. RIORDON, Primary Examiner

J. C. PETERS, Assistant Examiner